United States Patent
Hessman et al.

(10) Patent No.: US 7,578,638 B2
(45) Date of Patent: Aug. 25, 2009

(54) TOOL AND A CUTTING INSERT FOR CHIP REMOVING MACHINING

(75) Inventors: Ingemar Hessman, Sandviken (SE); Åke Johansson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/822,532

(22) Filed: Jul. 6, 2007

(65) Prior Publication Data
US 2008/0063481 A1 Mar. 13, 2008

(30) Foreign Application Priority Data
Sep. 12, 2006 (SE) .................................. 0601871

(51) Int. Cl.
*B23P 15/42* (2006.01)
(52) U.S. Cl. ....................................................... 407/13
(58) Field of Classification Search .................. 407/13, 407/15, 17–19, 113; 409/259, 260, 287
See application file for complete search history.

(56) References Cited

U.S. PATENT DOCUMENTS

| | | | | |
|---|---|---|---|---|
| 3,126,611 A | * | 3/1964 | Wiles | 407/17 |
| 3,526,025 A | * | 9/1970 | Sletten | 407/17 |
| 3,792,524 A | * | 2/1974 | Pomernacki | 407/1 |
| 3,849,852 A | * | 11/1974 | Billups | 407/15 |
| 4,243,347 A | * | 1/1981 | Clapp et al. | 407/15 |
| 4,740,115 A | * | 4/1988 | Hertel et al. | 407/15 |
| 5,176,480 A | * | 1/1993 | Kelm | 409/244 |
| 6,126,364 A | * | 10/2000 | Riviere | 407/15 |
| 2004/0265074 A1 | * | 12/2004 | Hessman et al. | 407/113 |

FOREIGN PATENT DOCUMENTS

JP 60263612 A * 12/1985
JP 63216619 A * 9/1988

* cited by examiner

Primary Examiner—Boyer D Ashley
Assistant Examiner—Sara Addisu
(74) Attorney, Agent, or Firm—Drinker Biddle & Reath LLP

(57) ABSTRACT

A cutting tool including a basic body and a plurality of cutting inserts arranged in series one after the other. Each insert includes a topside, an underside, two opposite side surfaces, front and rear ends, and a cutting edge adjacent to the front end. The rear end of a first cutting insert faces the front end of a second cutting insert disposed rearward of the first insert, and a chip space forward of the cutting edge of the second cutting insert is delimited by a chip-forming surface extending in the forward direction from the rear end of the first cutting insert, and a chip-forming surface extending downward from the cutting edge of the second cutting insert.

17 Claims, 4 Drawing Sheets

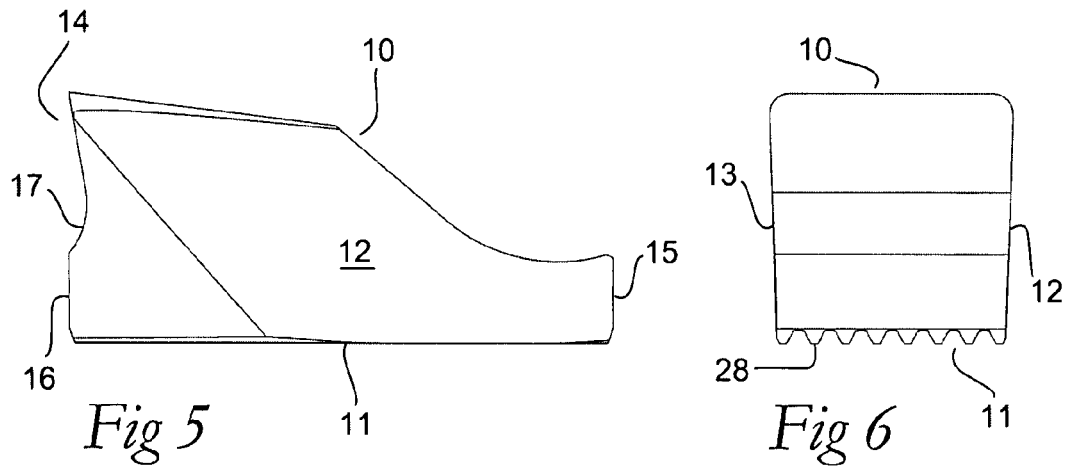
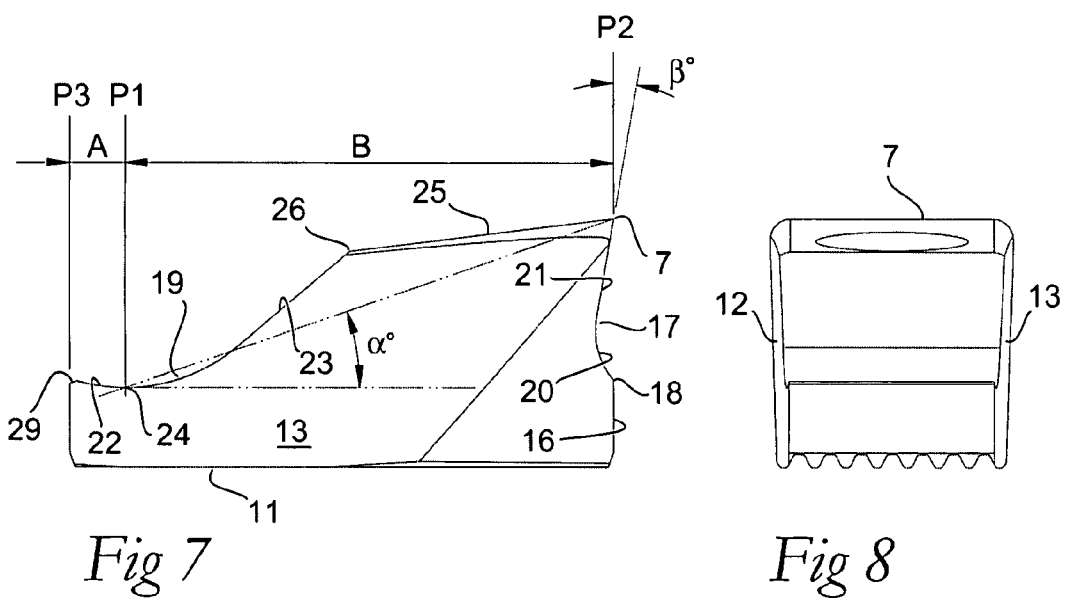
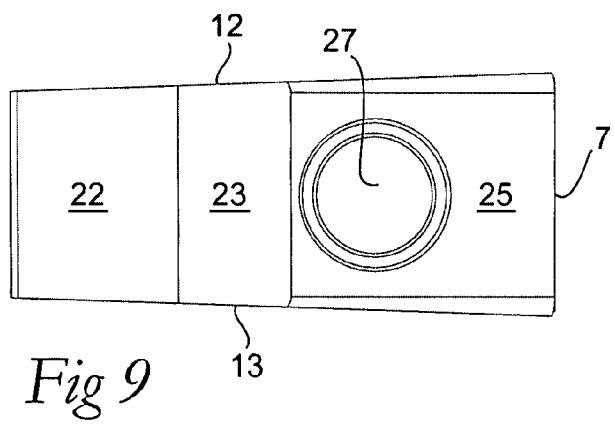

TOOL AND A CUTTING INSERT FOR CHIP REMOVING MACHINING

This application claims priority under 35 U.S.C. § 119 to Sweden Patent Application No. 0601871-7, filed on Sep. 12, 2006, the disclosure of which is incorporated by reference herein in its entirety.

FIELD OF THE INVENTION

The present invention relates generally to a cutting tool for chip removing machining of the type that includes a basic body and a plurality of cutting inserts arranged in series one after the other, which individually include a topside, an underside, two opposite side surfaces, front and rear ends, and a cutting edge adjacent to the front end. The invention also relates to an individual cutting insert for such tools.

BACKGROUND OF THE INVENTION

Many types of tools for cutting or chip removing machining of, in particular, workpieces of metal, are made with a plurality of replaceable cutting inserts situated in series one after the other, of the type that are manufactured from a hard and wear-resistant material, such as cemented carbide, ceramics or the like. Examples of such tools include linearly operating reaming tools, rotary milling cutters and stationary turning tools. With the purpose of attaining an efficient and quick machining, it has been a tendency to equip the basic bodies of the tools with a number of cutting inserts as large as possible per unit length. The more cutting inserts that can be mounted, for instance, along the periphery of a milling cutter, the more efficiently the milling cutter will work. The same also applies to such linearly operating tools, e.g., reamers, in which the cutting inserts are mounted in a straight line one after the other.

In previously known cutting tools, the cutting inserts are mounted individually and spaced-apart in so-called insert seats in the basic body of the tool, which is manufactured from a softer material, e.g., steel, the cutting inserts being spaced-apart by spaces, which at least partly form requisite chip channels, i.e., gaps in which the detached chips can be accommodated during continued feed of the tools. In other words, the individual chip channel is delimited by a most often smaller part surface (chip surface) included in the cutting insert, as well as a usually larger part surface included in the basic body. The requirement to form the basic body of the tool with relatively widely spaced-apart insert seats to create chip channels between the mounted cutting inserts, of course limits the options for the designer to optimize the number of cutting inserts in the tool. Another shortcoming of known cutting tools is that the hot chips come in immediate contact with not only the heat-resistant material of the cutting inserts, but also with the less heat-resistant material of the basic body.

SUMMARY OF THE INVENTION

The present invention aims at obviating the above-mentioned shortcomings of previously known cutting tools and at providing an improved cutting tool. Therefore, an object of the invention is to provide a cutting tool, which can be equipped with a large number of cutting inserts per unit length without reducing the ability of the tool to form and evacuate chips. An additional object is to provide a cutting tool, the basic body of which can be made in a structurally easy manner at the same time as the cutting inserts can be fixed in a persistently stable manner on the basic body.

In an embodiment, the invention provides a cutting tool including a basic body and a plurality of cutting inserts arranged in series one after the other. Each insert includes a topside, an underside, two opposite side surfaces, front and rear ends, and a cutting edge adjacent to the front end. The rear end of a first cutting insert faces the front end of a second cutting insert disposed rearward of the first insert, and a chip space forward of the cutting edge of the second cutting insert is delimited by a chip-forming surface extending in the forward direction from the rear end of the first cutting insert, and a chip-forming surface extending downward from the cutting edge of the second cutting insert.

In another embodiment, the invention provides a cutting insert for cutting tools, including a topside, an underside, two opposite side surfaces, front and rear ends, and a cutting edge adjacent to the front end. The front end includes a first contact surface situated below a first chip-forming surface to which the cutting edge connects. The first chip-forming surface is higher than the rear end which includes a second, rear contact surface, from which a second chip-forming surface extends in the forward direction along the topside.

In one sense, the invention is based on the idea of forming requisite chip channels only in the cutting inserts and not in the basic body, and to let cutting inserts support cutting inserts. By forming the individual cutting insert with a front as well as a rear chip-forming surface, the cutting inserts can be brought together end-to-end. Therefore, irrespective of whether the cutting inserts are mounted in a straight or arched series one after the other, the tool will be realizable with an optimal number of cutting edges per unit length. Thus, the limiting factor of the number of cutting inserts is the length of the cutting inserts from end to end.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 5 is a side view of the cutting insert of FIG. 3 as viewed from one side;

FIG. 6 is an end view showing the cutting insert of FIG. 3 from the front;

FIG. 7 is a side view from the opposite side of FIG. 5;

FIG. 8 is an end view showing the cutting insert of FIG. 3 from behind;

FIG. 9 is a planar view showing the topside of the cutting insert of FIG. 3;

DETAILED DESCRIPTION OF THE PREFERRED EMBODIMENTS

Figure 1:
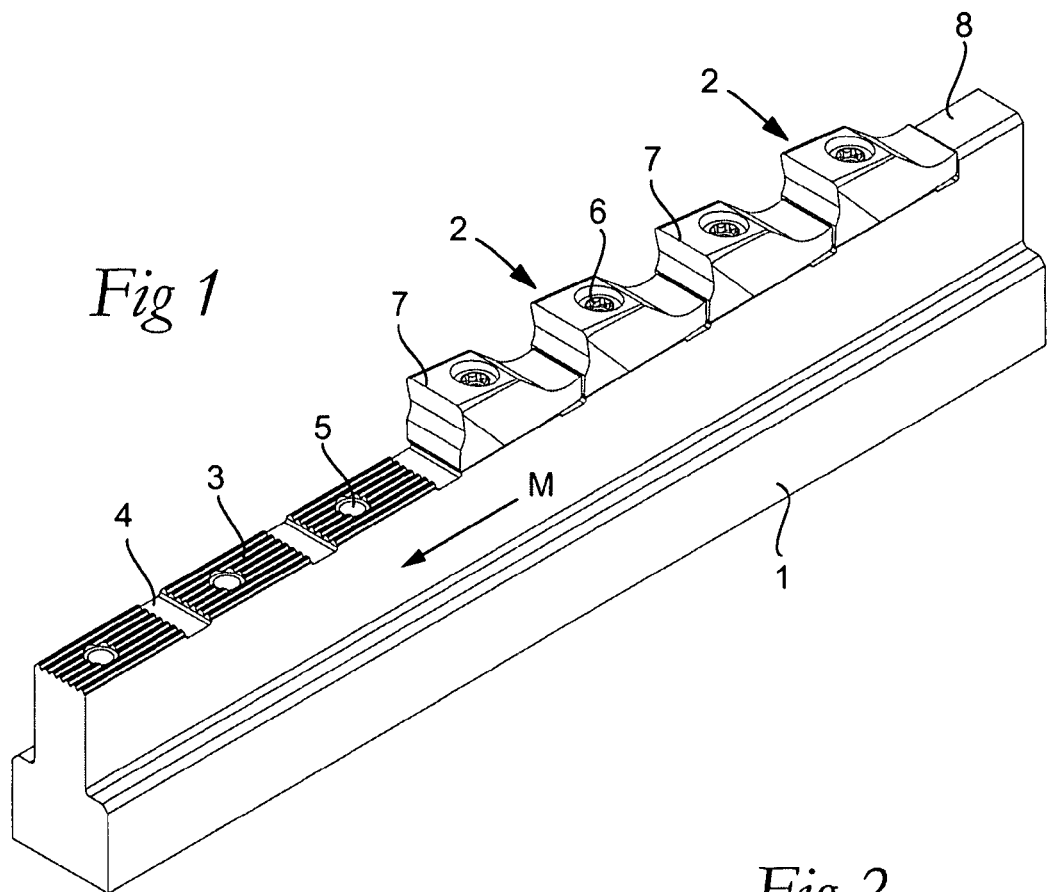
FIG. 1 is a perspective view of a cutting tool according to an embodiment of the invention in the form of a reaming tool.
Figure 2:
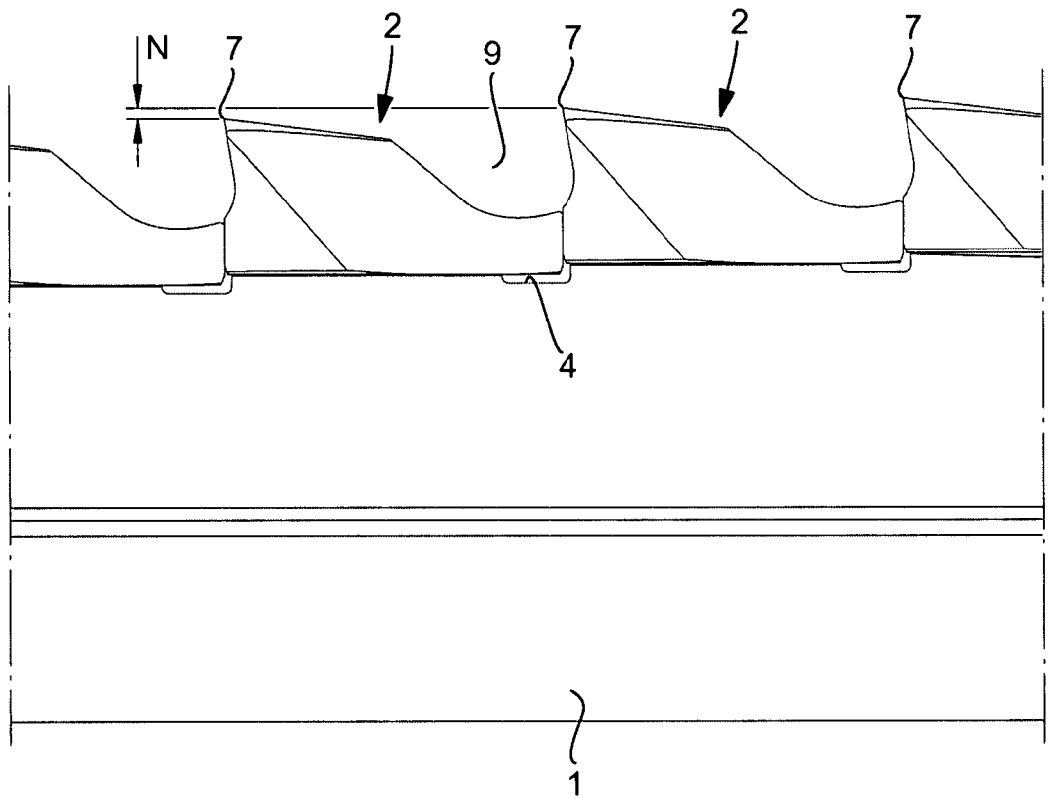
FIG. 2 is a partial side view showing the position of the cutting inserts in the basic body of the tool.
Figure 3:
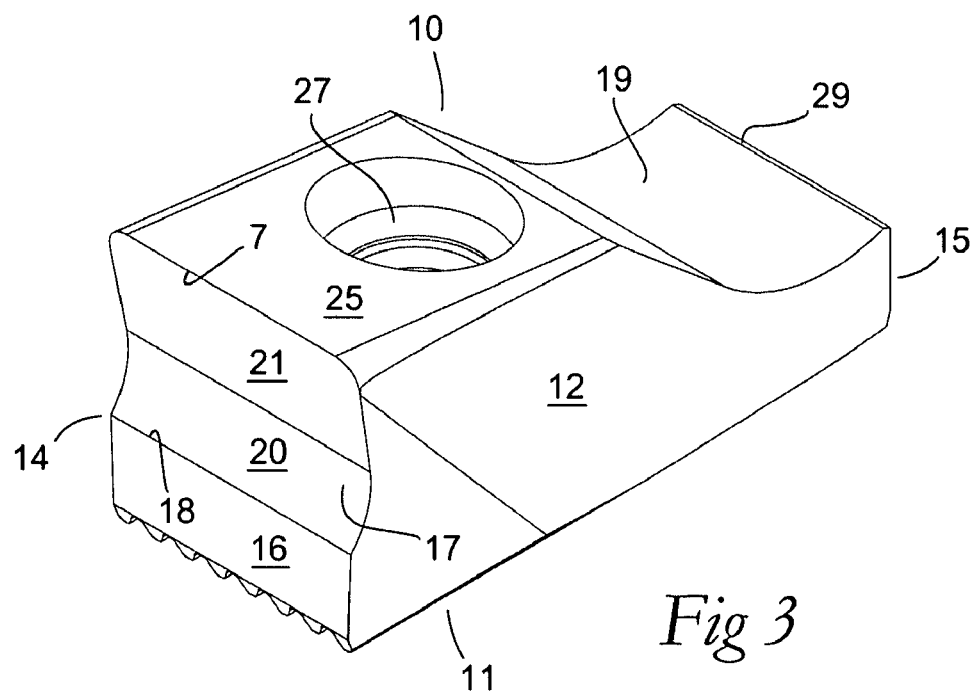
FIG. 3 is a top-side view of an individual cutting insert according to an embodiment of the invention.
Figure 4:
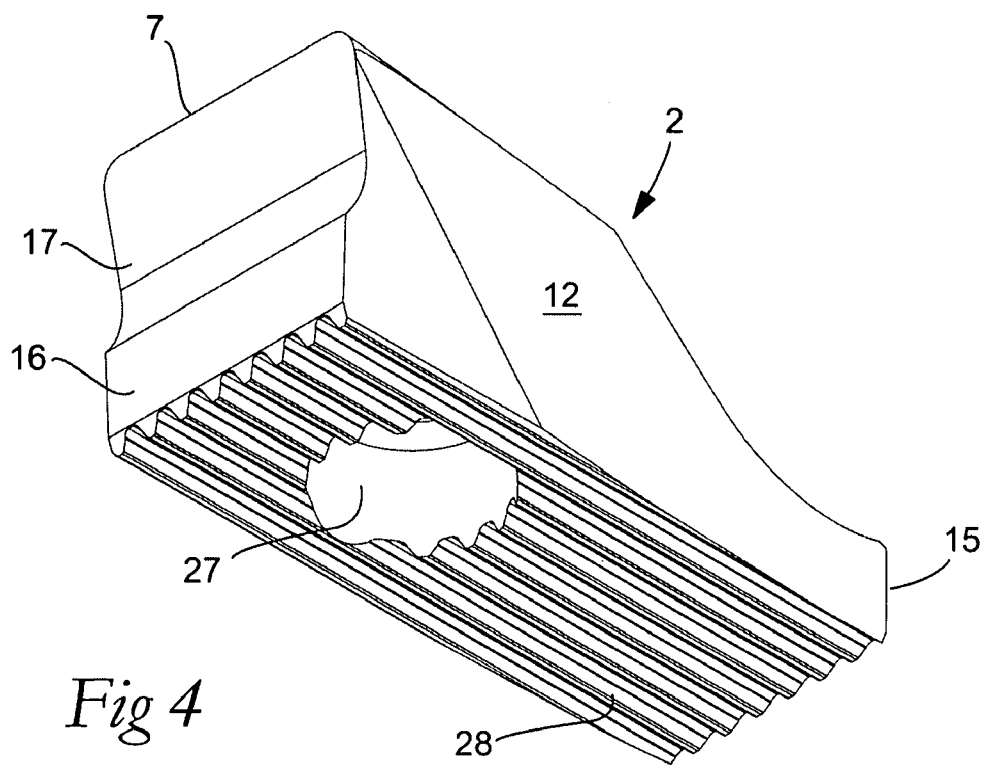
FIG. 4 is a bottom-side view of the cutting insert of FIG. 3.

As an example of a cutting tool to which the invention may be applied, a reaming tool is shown in FIGS. 1 and 2. The tool includes a basic body 1, as well as a plurality of cutting inserts 2 arranged in series one after the other. In this case, the basic body has a long narrow, straight basic shape, which generally resembles a ruler or T-beam. In the example, respective inserts 2 are each mounted in an insert seat 3, which in this case is in the form of a serration connecting surface that only includes straight and parallel ridges and grooves, respectively, which extend axially in the length extension of the basic body. Adjacent insert seats 3 are mutually spaced-apart by clearance spaces in the form of transverse notches 4. In each insert seat, a threaded hole 5 mouths for a screw 6 for clamping the cutting insert in a desired seat along the basic body. Each individual cutting insert includes a cutting edge 7, which in the example is straight and extends essentially along the entire width of the cutting insert. As is illustrated in FIG. 2, the edges 7 of the different cutting inserts are situated on different levels in relation to the basic body. In particular, the edge of each rearward cutting insert is situated higher than the edge of the respective forward cutting insert (see the level difference N). When operating, the tool is fed linearly in relation to the workpiece in the feeding direction M, the cutting inserts in a traditional way providing a notch having a successively increasing depth and/or width. It should also be noted that the rear cutting insert of the row of cutting inserts (see FIG. 1) is pressed against a stop in the form of a lip 8.

Between each pair of adjacent cutting inserts, there is a chip channel designated 9, which is delimited by part surfaces on two cutting inserts of a pair.

In practice, the basic body 1 is suitably manufactured from steel, while the cutting inserts are manufactured from cemented carbide or other hard and wear-resistant materials.

Reference is now made to FIGS. 3-9, which in detail illustrate the geometrical design of the cutting insert according to an embodiment of the invention. The cutting insert includes a topside 10, a plane underside 11, two opposite side surfaces 12, 13, as well as front and rear ends 14 and 15, respectively. Generally, the edge 7 is formed in the transition between the topside 10 and the front end 14.

At the front end thereof, the cutting insert is higher or thicker than at the rear end. In the front end, a first contact surface 16 is included, which is situated below a first chip-forming surface 17, which extends between the cutting edge 7 and a borderline 18, which separates the surfaces 16, 17 from each other.

The rear end of the cutting insert is represented by a second contact surface 15 that cooperates with a first contact surface on an adjacent cutting insert of the tool. At the upper part thereof, the second contact surface 15 transforms via a transition 29 into a second chip-forming surface 19, which extends forward and upward along the topside of the cutting insert. In the shown embodiment, each one of the two chip-forming surfaces 17, 19 has a partially concave shape. Thus, the lower part 20 of the first chip-forming surface 17 is concave having a radius of curvature that may decrease in the downward direction toward the borderline 18. At the top, the concave part surface may transform into a plane part surface 21, which ends in the edge 7.

In an analogous way, the rear chip-forming surface 19 is formed with a concave part surface 22, and a plane part surface 23. The partially concave shape of the chip-forming surface is determined by an arc line having a lowest bottom point 24 situated at an axial distance A from the rear contact surface 15. In FIG. 7, P1, P2 and P3 designate three axially spaced-apart planes, all of which are perpendicular to the underside 11 of the cutting insert and of which P1 extends vertically from the bottom point 24, P2 is located along the edge 7, and P3 is located in the extension of the contact surface 15. The distance between the planes P1 and P2 is designated B. As illustrated in FIG. 7, the distance B is greater than the distance A.

Furthermore, an imaginary straight line between the bottom point 24 and the edge line 7 forms an angle α in relation to the underside 11 or a reference plane parallel thereto (in this case also the feeding direction M of the tool).

In front, the rear chip-forming surface 19 transforms into an upper clearance surface 25 via a borderline 26. Clearance surface 25 may advantageously be plane and extend obliquely downward rearward from the edge line 7. In other words, the borderline 26 is situated on a lower level in relation to the underside 11 than the edge line 7.

In the example shown, a through hole 27 for the fixing screw 6 is in its entirety situated in front of the chip-forming surface 19, i.e., in front of the borderline 26. As such, the upper part of the hole mouths in the clearance surface 25, while the lower part mouths in the underside 11.

On the underside of the cutting insert, a serration connecting surface 28 is formed, for locking the cutting insert laterally. In particular, the connecting surface 28 is of the type that includes a plurality of straight and mutually parallel ridges, and grooves between the same. Advantageously, the serration connecting surface 28 extends along the entire underside 11. Because all ridges and grooves are straight and extend only in the length extension of the cutting insert, the cutting insert is locked laterally, but not longitudinally.

In the shown embodiment, where the cutting inserts are mounted in a line one after the other along a straight basic body, respective front and rear contact surfaces 16, 15 are mutually parallel. In practice, the contact surfaces may be plane to provide complete surface contact in co-operation with each other. However, it is also foreseen that one of the two contact surfaces could be made with a weak camber in the form of a convexity having an utmost large radius (e.g., several meters).

When the individual cutting edge during reaming removes a chip, the chip is contained in the chip channel 9 delimited by the front and rear chip-forming surfaces 17, 19 on adjacent cutting inserts, and the bottom and side walls of the generated notch, the chip not being detached until the cutting insert has passed the end of the notch. The shape of the chip channel has a decisive importance for the chip forming and evacuation. If the tool is used for the machining of short-chipping materials, the requirements of chip forming are moderate. In such cases, the two chip-forming surfaces on the cutting insert may be given a fairly simple geometrical shape. For instance, one of or both chip-forming surfaces may be plane. However, in tools for the machining of longer-chipping materials, higher requirements are made on the chip forming in order to avoid chip stopping in a reliable way. In such cases, at least one of the chip-forming surfaces, and suitably both, should be at least partially concave, such as shown in the drawings. By virtue of the round concave shape, the detached chip is forced to curl up into a watchspring-like helical shape having a shape optimized for each kind of material. The center of such a chip watch will be located approximately vertically above the lowest point of the rear chip-forming surface, i.e., in the plane P1. The distances A, B between the center of the chip watch and the edge line 7, and the rear contact surface 15, together with the radii of curvature of the concavities, are important to the chip-forming ability of the cutting insert. Even if the distance B should be greater than the distance A, B should in practice be at most 10, suitably at most 7, times greater than A.

A general desire is that the cutting insert should be as short and compact as possible, in order to give room for a maximum number of cutting inserts and cutting edges for a given tool length. However, this desire conflicts with the requirement of chip forming because the chip channel formed between adjacent cutting inserts occupies a certain space horizontally as well as vertically. For this reason, the distance A cannot be too small in relation to the distance B.

Another important factor is how the cutting insert tapers in the direction from the front toward the rear end. The tapering shape is represented in FIG. 7 by the angle α between any reference plane parallel to the underside, and an imaginary straight line intersecting the bottom point 24 as well as the edge line 7. In practice, the angle α should not be less than 18°, and not more than 45°. In practice, angles within the range of 20-30° are preferred.

With continued reference to FIG. 7, the cutting edge of the instant embodiment has a positive cutting geometry, as illustrated by the angle β.

Figure 10:
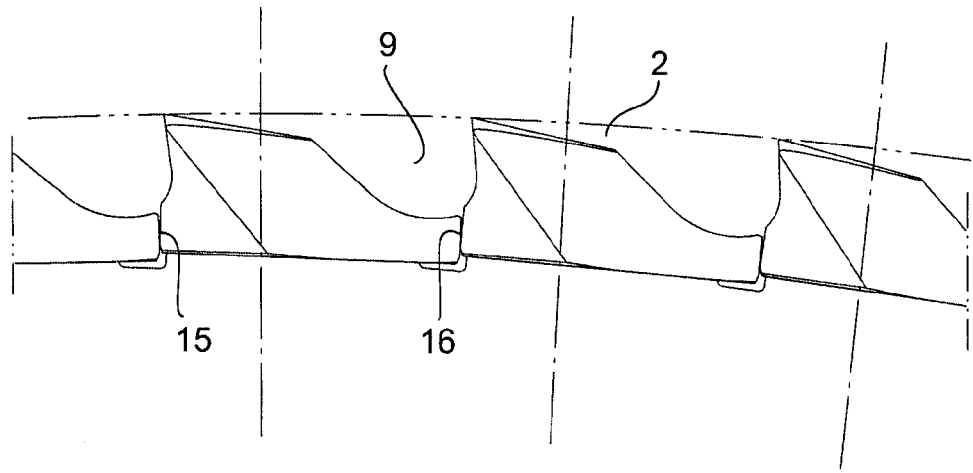
FIG. 10 is a detailed section corresponding to FIG. 2, which illustrates an alternative embodiment of the tool.

FIG. 10 illustrates an embodiment of the invention applied to tools in which the cutting inserts together form an arched configuration, e.g., a circular rim along the periphery of a rotatable tool, such as a milling cutter. In such cases, the two opposite contact surfaces 15, 16 of the respective cutting inserts may form an acute angle with each other instead of being mutually parallel. The underside of the cutting insert may also be modified in various ways in order to fit the arc-shape.

Figure 11:
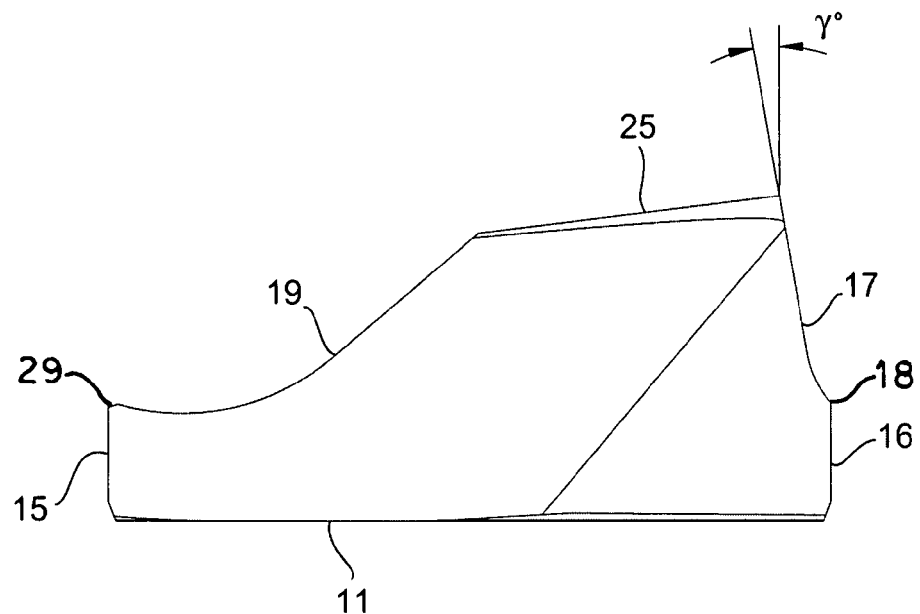
FIG. 11 is a side view showing an alternative embodiment of the cutting insert.

In FIG. 11, an alternative cutting insert is illustrated having a negative cutting geometry illustrated by the angle γ.

In the shown, embodiment, the turning line 18 between the chip-forming surface 17 and the contact surface 16 at the front end of the cutting insert is situated on a higher level in relation to the underside 11 than the turning line or the transition 29 between the rear contact surface 15 and the rear chip-forming surface 19. In such a way, it is facilitated that the formed chip, which moves downward along the front chip-forming surface 17, without resistance, slides over onto the chip-forming surface 19.

A fundamental advantage of the invention is that a large number of cutting inserts can be accommodated within a given length along the basic body of the tool, because the basic body does not need to be formed with any chip-forming surfaces. Furthermore, when the cutting inserts are pressed in close contact against each other via the contact surfaces 15, 16, the advantage is obtained that the hot chips do not contact parts of the basic body, but only the hard and comparatively heat-resistant cemented carbide of the cutting inserts.

The invention is not limited only to the embodiments described above and shown in the drawings. Thus, the invention may be applied to cutting tools irrespective of whether the tools are movable or stationary during operation. The movable cutting tools may work in miscellaneous ways, in addition to linearly and rotary. Furthermore, the design of the cutting insert according to the invention may vary within broad limits. Thus, for the machining of short-chipping materials, the two chip-forming surfaces may have simple geometrical shapes, while the more complicated machining of, for instance, long-chipping materials requires cutting inserts having chip-forming surfaces of a more sophisticated character individually measured for each individual application, usually with one or more concavities such as shown in the drawings. In this connection, the front chip-forming surface could be formed with a central pit positioned near the edge line in the form of a shallow cavity, which imparts a cross-section-wise curved shape instead of a plane shape to the chip. In such a way, the edges of the chip are deflected in the direction inward, whereby the width of the chip is reduced, to further reduce the risk of chip stopping. Although the invention envisions the possibility of pressing the different cutting inserts in direct contact with each other, it is also possible to mount, between adjacent cutting inserts, a short shim of a material, e.g., steel, that is softer than the hard and relatively brittle material of the cutting inserts. Like the cutting inserts, such shims could be formed with serration connecting surfaces on the underside thereof. Possible shims should have a length of at most 20%, suitably at most 10%, of the length of the cutting insert. In this connection, the fastening member shown in the form of a screw primarily holds the individual cutting insert in place, but does not substantially carry the cutting force. Thus, occurring cutting forces are carried in a train of forces via the consecutive cutting inserts (and possible shims) up to a stable stop. Possible, small motions between the cutting inserts along the appurtenant insert seat then only manifest themselves in that the screws deflect insignificantly. The cutting inserts could be held in place by other means than screws tightened from above. In the tool shown in FIGS. 1 and 2, the cutting inserts have an identical shape, the requisite level difference between consecutive cutting edges having been provided by locating the insert seats like stair treads on different levels. It is also possible to use a single plane insert seat (serration connecting surface) and give the cutting inserts different, successively increasing height. The shape (e.g., arched) and situation of the cutting edge or edge line in the tool (e.g., inclined in relation to the feeding direction M) may vary most considerably, and the side surfaces of the cutting insert may serve as clearance surfaces. In particular, the side surfaces may include (triangular) part surfaces that clear in the backward direction as well as in the downward direction. Furthermore, the insert seats shown in FIG. 1 do not need to be parallel to each other. Thus, they may also be inclined in relation to the feeding direction. For instance, the insert seats may together form, in a side view of the cutting tool, a generally saw-toothed shape. In such a case, the occurring cutting forces of the individual cutting insert may be carried entirely or partly by the abutment thereof against the appurtenant insert seat. Generally, the undersides of the cutting inserts and the situation thereof in relation to the basic body are incidental to the invention.

It is feasible to form the individual cutting insert with two or a plurality of chip-removing edges mutually spaced-apart by a chip channel, e.g., in the form of a single continuous, concave chip-forming surface, the cutting insert still including rear and front chip-forming surfaces, which can co-operate with rear and front chip-forming surfaces on other cutting inserts in the series of cutting inserts.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A cutting tool comprising:
a basic body and a plurality of cutting inserts arranged in series one after the other, each insert including a topside, an underside, two opposite side surfaces, front and rear ends, and a cutting edge adjacent to the front end,
wherein the rear end of a first cutting insert faces the front end of a second cutting insert disposed rearward of the first insert, and a chip space forward of the cutting edge of the second cutting insert is delimited by a chip-forming surface extending in the forward direction from the rear end of the first cutting insert, and a chip-forming surface extending downward from the cutting edge of the second cutting insert, the chip-forming surface extending in the forward direction from the rear end of the first cutting insert having a plane part surface and a concave part surface, the concave part surface being determined by an arc line, which has a lowest bottom point situated at a distance (A) from the rear end of the first cutting insert, the chip-forming surface extending downward from the cutting edge of the second cutting insert having a plane part surface and a concave part surface.

2. The cutting tool according to claim 1, wherein the chip space is delimited only by the two chip-forming surfaces.

3. The cutting tool according to claim 1, wherein contact surfaces on respective cutting inserts are pressed in close contact against each other.

4. The cutting tool according to claim 1, wherein the tool is linearly movable, the cutting edges of respective cutting inserts being situated at successively increasing heights in relation to a feeding direction of the tool.

5. The cutting tool according to claim 4, wherein the cutting inserts are identical and mounted in insert seats situated at different heights in relation to a common reference plane that is parallel to the insert seats.

6. A cutting insert for cutting tools, comprising:
a topside, an underside, two opposite side surfaces, front and rear ends, and a cutting edge adjacent to the front end, wherein the front end includes a first contact surface situated below a first chip-forming surface to which the cutting edge connects, the first chip-forming surface being higher than the rear end which includes a second, rear contact surface, from which a second chip-forming surface extends in the forward direction along the topside, the second chip-forming surface having a plane part surface and a concave part surface, the concave part surface being determined by an arc line which has a lowest bottom point situated at a distance (A) from the rear contact surface, the first chip-forming surface having a plane part surface and a concave part surface.

7. The cutting insert according to claim 6, wherein at least the lower part of the first chip-forming surface is concave down to a lower borderline in which the lower part transforms into the first contact surface.

8. The cutting insert according to claim 6, wherein the distance (B) between a first plane perpendicular to the underside and intersecting the bottom point, and a second plane through the cutting edge, is greater than the distance (A) between the first plane and a third plane that is flush with the rear contact surface.

9. The cutting insert according to claim 8, wherein the distance (B) is at most, 7 times greater than the distance (A).

10. The cutting insert according to claim 6, wherein an angle ($\alpha$) between a plane parallel to the underside, and an imaginary, straight line between the bottom point and the cutting edge is at least 18°.

11. The cutting insert according to claim 10, wherein the angle ($\alpha$) is at most 45°.

12. The cutting insert according to claim 6, wherein the second chip-forming surface in front transforms into a clearance surface via a borderline located on a level below the highest level of the edge.

13. The cutting insert according to claim 12, wherein a through hole for a fastening member is situated in front of the second chip-forming surface so as to mouth in the clearance surface and in the underside.

14. The cutting insert according to claim 6, wherein the underside includes a serration connecting surface to lock the cutting insert laterally.

15. The cutting insert according to claim 14, wherein the serration connecting surface only includes longitudinal, straight ridges and grooves to lock the cutting insert laterally, but not longitudinally.

16. The cutting insert according to claim 6, wherein the two front and rear contact surfaces are mutually parallel.

17. The cutting insert according to claim 16, wherein one of the contact surfaces is plane and the other one slightly convex.

* * * * *